Nov. 10, 1953
E. H. HURLEY
2,658,970
LIQUID LEVEL ACTUATED SWITCH
Filed Oct. 23, 1951
2 Sheets-Sheet 1
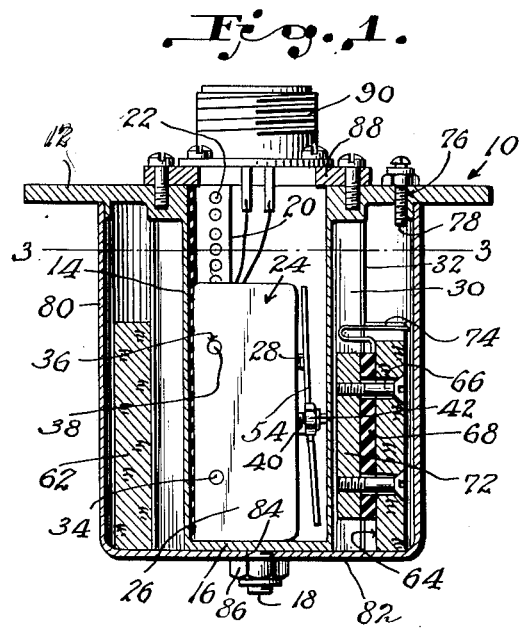
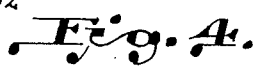
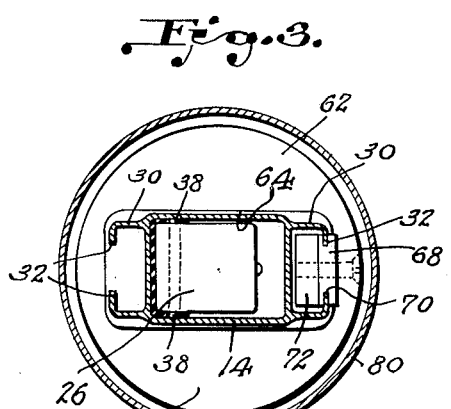
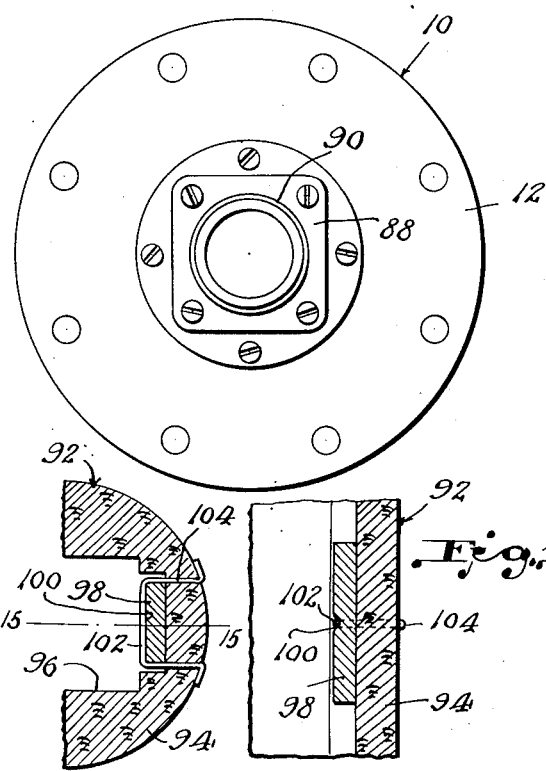
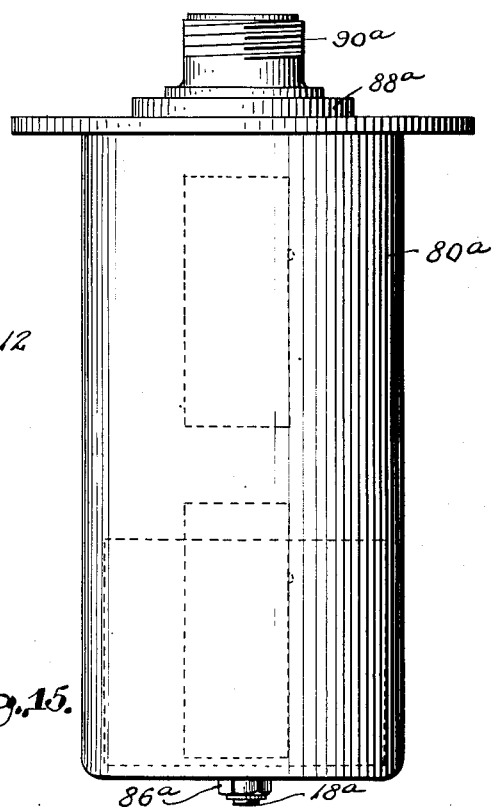
Earl H. Hurley
INVENTOR
BY C. A. Snow & Co.
ATTORNEYS

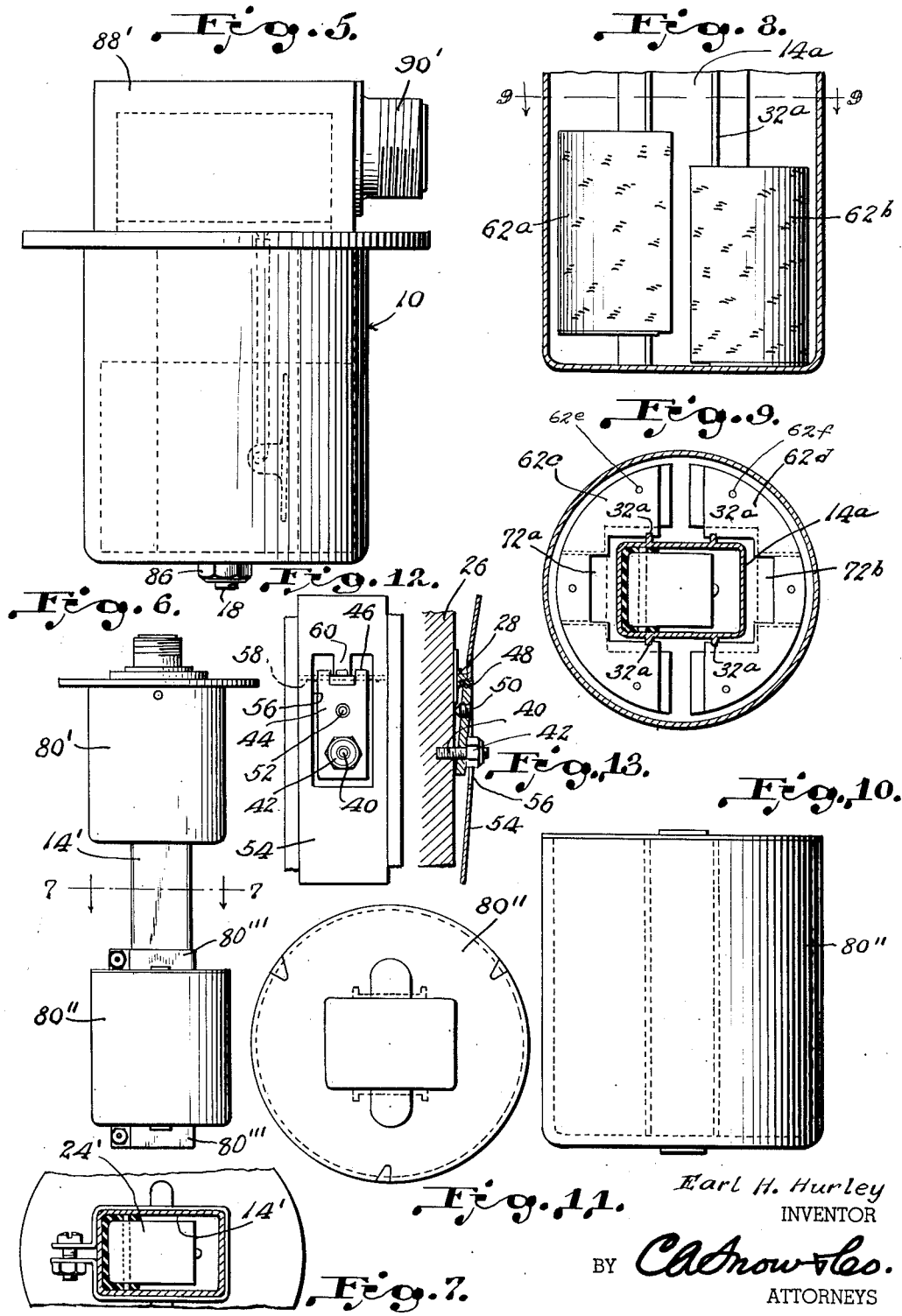

Patented Nov. 10, 1953

2,658,970

UNITED STATES PATENT OFFICE 2,658,970

LIQUID LEVEL ACTUATED SWITCH

Earl H. Hurley, Corry, Pa., assignor of ten per cent to Jerrold L. Lansberry, Corry, Pa.

Application October 23, 1951, Serial No. 252,761

3 Claims. (Cl. 200—84)

This invention relates to a liquid level actuated switch and has for its primary object to enable the liquid level in a tank to be held at a minimum distance from the top thereof.

Another object is to avoid utilizing an unnecessary amount of space within a tank and thereby to preserve to the maximum extent the capacity of the tank.

A further object is to enable the switch to be attached to the tank and give access to the switch through an opening in the tank of minimum size.

Still another object is to reduce the effective buoyancy of the float as it approaches the upper limit of its travel and to thus utilize the capacity of the tank to its fullest extent.

A further object of the invention is to utilize the magnetic field of a float supported magnet for actuating the switch.

The above and other objects may be attained by employing this invention which embodies among its features an elongated hollow water tight housing, a magnetically actuated switch mounted within said housing for adjustment vertically thereof, a float mounted on the exterior of the housing for movement vertically thereon and a magnet carried by the float for influencing the movements of the magnetically actuated switch.

Other features include guides carried by the housing and extending longitudinally thereof on its exterior upon which the float is supported for vertical movement with relation to the housing.

Still other features include a resilient stop carried by the float adjacent one end thereof for movement therewith, and a stop screw carried by the housing for engaging the stop and arresting movement of the float and the magnet at a selected level.

Still further features include a switch of the type having a casing and a depressible button extending through said casing for controlling the switch, means for actuating said button comprising an elongated bearing arm connected adjacent one end to said switch casing remote from the button, said bearing arm extending along said switch casing toward said button, a lever of magnetically responsive material pivotally mounted intermediate its ends on the bearing arm adjacent the end thereof remote from that which is connected to the switch casing, said lever being movable in an arcuate path into and out of engagement with the switch button and a screw threadedly extending through the bearing arm intermediate the ends thereof for engaging the switch casing and advancing or retracting the lever relative to the button.

In the drawings,

Fig. 1 is a vertical sectional view through a liquid level actuated switch embodying the features of this invention, Fig. 2 is a plan view of the switch illustrated in Fig. 1, Fig. 3 is a horizontal sectional view taken substantially along the line 3—3 of Fig. 1, Fig. 4 is a side view of a modified form of switch housing showing two switches mounted therein in vertical alignment, Fig. 5 is a side view of a further modified form of switch, Fig. 6 is a further modification of the invention showing the switches mounted in vertical alignment, Fig. 7 is a transverse sectional view take substantially along the line 7—7 of Fig. 6, Fig. 8 is a fragmentary sectional view through a further modification of the invention, Fig. 9 is a transverse sectional view taken substantially along the line 9—9 of Fig. 8, Fig. 10 is a side view in elevation of the float housing, Fig. 11 is a top plan view of the float housing illustrated in Fig. 10, Fig. 12 is a fragmentary front view of the switch casing and magnetically responsive actuating arm, Fig. 13 is a fragmentary sectional view through the structure illustrated in Fig. 12 showing the manner in which the switch actuating lever is mounted.

Fig. 14 is a horizontal sectional view through a float showing a modified form of mounting the magnet thereon, and Fig. 15 is a vertical sectional view taken substantially on the line 15—15 of Fig. 14.

Referring to the drawings in detail this improved switch designated generally 10 comprises a supporting plate 12 which is adapted to be attached to the top of a conventional fuel tank. Formed integrally with and depending from the plate 12 is a switch housing 14 which is open at its top and is provided with a bottom wall 16 carrying an externally screw threaded stud 18 which depends axially therefrom. The only means of access to the housing 14 is through the open upper end thereof, and secured to the side walls of said housing and extending longitudinally thereinto through the open top to the bottom 16 thereof is a transversely U-shaped insulator 20 having in its side flanges longitudinal rows of longitudinally spaced openings 22 with the openings of one flange aligning with those of the opposite flange. Mounted within the housing 14 is a switch designated generally 24 which is enclosed within a casing 26 through which extends an actuating button 28 by means of which the operation of the switch is controlled. The button 28 is depressible and is normally yieldingly held outwardly so that the operation of the switch may be effected simply by pressing the button inwardly. Carried by the housing 14 on the exterior thereof and projecting outwardly from opposite sides are elongated vertically extending guides 30 having inturned opposed flanges 32, the purpose of which will hereinafter appear. The side walls of the switch casing 26 are provided adjacent one end with outwardly extending projections 34 which are adapted to engage in the openings 22 of the flanges of the insulator 20, and formed in the switch casing 26 in spaced relation to the projections 34 are aligned openings 36 for the reception of a locating pin 38 which projects through the openings 36 and into selected openings in the insulator 20.

Carried by the casing 26 in spaced relation to the button 28 is a screw threaded stud 40 on which is held by a suitable nut 42 an arm 44. This arm is provided adjacent its end remote from the stud 42 with a pair of vertically extending horizontally spaced ears 46 which are provided with aligning openings for the reception of a pivot pin 48, and formed intermediate the ends of the arm 44 is an internally screw threaded opening 50 for the reception of a set screw 52 which extends through and threadedly engages the opening 50 with its point bearing on the casing 26 of the switch 24. A lever 54 of a magnetically responsive material is provided intermediate its ends with an elongated rectangular recess 56 and formed in said lever and extending therethrough adjacent one end of the opening 56 therein are aligned openings 58 through which the pivot pin 48 is adapted to extend in order to pivotally support the lever on the arm 44. Carried by the arm and extending into the recess 56 therein is a tongue 60 which when the device is in place on the switch casing 26 lies adjacent the depressible button 28, so that as the lever is moved about its pivot the button will be engaged by the tongue 60. Obviously a micrometer adjustment of the tongue 60 with relation to the button 28 may be achieved by turning the set screw 62, and altering thereby the position of the pivot pin 48 with relation to the adjacent wall of the casing 26.

Mounted for vertical sliding movement on the guides 30 and guide flanges 32 is a float 62 which is of circular cross section and has extending therethrough an elongated transverse opening 64 which as illustrated extends around the housing 14. As shown the float encircles the housing and secured to the float as by bolts 66 is an elongated bearing member 68 having oppositely disposed longitudinally extending grooves 70 in opposite side edges thereof. An elongated magnet 72 is provided with spaced internally screw threaded openings for the threaded ends of the bolts 66 and these bolts extend through spaced openings in the float bearing member 68 which align with the openings in the float and in the magnet, and threadedly engage threaded openings which extend through the magnet so that when the screws 66 are tightened, the float bearing or carriage 68 will be clamped against the float. Carried by the upper end of the float is a yielding transversely extending stop member 74 which may be formed of a flat strip of spring metal bent into substantially the shape illustrated in Fig. 1, and threaded through an internally screw threaded opening 76 formed in the cover plate 12 is a screw 78 which aligns with the stop member so that the upward movement of the float may be arrested at a selected position by the screw 78.

A float housing 80 comprising a substantially cup-shaped member having a bottom wall 82 is provided in the center of the bottom wall thereof with an opening 84 for the reception of the stud 18 so that upon placing the housing 80 in substantially the position shown in Fig. 1, and threading a nut 86 on the stud 18, the housing may be held in contact with the cover plate 12.

A suitable fitting 88 is removably attached to the head or plate 12 in axial alignment with the open upper end of the switch housing 14 and in one form of this invention, the fitting 88 is equipped with an externally screw threaded nipple 90 which may be coupled to any suitable conduit through which conductors leading from the switch 24 may be extended.

In the modified form of the invention illustrated in Fig. 15, a float designated generally 92 comprising a buoyant body 94 having a guide accommodating opening 96 extending therethrough carries a magnet 98 which is provided intermediate its ends and in the exposed side thereof with a transversely extending groove 100 for the reception of the bight portion 102 of a staple 104 which projects through the float 94 and has its ends turned outwardly as illustrated in Fig. 14 in order to secure the staple and magnet in proper position within the float.

In the modified form of the invention illustrated in Fig. 5 instead of the fitting 88 I employ a fitting 88' which may be provided on one side with a laterally projecting nipple 89'.

Similarly in the modified form of the invention illustrated in Figs. 6 and 7 the switch containing housing and float guide designated 14' may be extended downwardly through the uppermost float housing 89', and the housing 14' may be equipped with vertically spaced switches 24' while the float housings 89' and 89'' contain float mechanism corresponding to that previously described. The float housing 89'' may be adjustably held on the switch housing 14' by clamping bands 89'''. Alternatively two vertically spaced floats may be mounted on the float guide 14' and the float guide and floats may be enclosed in an elongated float housing 89a, so that a magnet carrying float mounted on the float guide may progressively and sequentially actuate the switches.

In certain instances it may be desirable to provide a switch housing 14a with laterally extending flanges 32a which form guides for substantially semicircular floats 62a and 62b, each carrying its respective magnet 72a and 72b for operating on switches carried within the housing 14a. Guide plates 62c and 62d are secured to the floats 62a and 62b for slidingly supporting the floats 62a and 62b by means of pins 62e and 62f on the housing 14a.

By using a switch housing of rectangular cross section the floats are held against rotation and the magnets are retained in proper position to influence the switch levers.

In use a hole is drilled in the top of a tank and is of sufficient diameter to receive the float housing 80 previously referred to with the plate 12 resting on the top of the tank. A switch 24 is then introduced into the open upper end of the switch housing 14 and located at the desired position by the dimples 34 engaging the walls of the openings 22 and the extending of a pin 38 through the opening 36. With the switch properly located, and the arm 44 adjusted to a position which will bring the tongue 60 of the lever 54 into the desired position relative to the button 28, the float 62 moving on its guides 32 and carrying the magnet 72 will cause the lever 54 to rock on its pivots as the float rises or falls within the float chamber 80. The rocking of the lever 54 will depress or release the button according to its direction of movement and thereby cause the switch 24 to be opened or closed. Obviously the upper limit to which the float may move may be regulated by turning the screw 78 and causing the inner end thereof to engage the spring tongue 74, thus giving a micrometer adjustment to the upper limit of movement of the float. Likewise by turning the set screw 52, a micrometer adjustment of the engagement of the tongue 60 of the lever 54 relative to the button 28 may be secured.

While in the foregoing there has been shown and described the preferred embodiment of this invention it is to be understood that minor changes in the details of construction combination and arrangement of parts may be resorted to without departing from the spirit and scope of the invention as claimed.

What is claimed is:

1. In a liquid level actuated switch an elongated transversely rectangular hollow water tight housing, a magnetically actuated switch mounted within said housing for adjustment vertically thereof, a float having a rectangular opening extending therethrough for receiving said housing, said float being movable vertically on said housing and a magnet carried by the float adjacent the housing for influencing the movements of the magnetically actuated switch.

2. In a liquid level actuated switch an elongated hollow water tight housing, a magnetically actuated switch mounted within said housing for adjustment vertically thereof, guides carried by the housing and extending vertically on the exterior thereof, a float encircling the housing and mounted on the guides for movement vertically thereon adjacent the housing, and a magnet carried by the float for movement therewith between the float and the housing.

3. In a liquid level actuated switch an elongated hollow water tight housing, a magnetically actuated switch mounted within said housing for adjustment vertically thereof, vertical guides carried by the housing and extending laterally from opposite sides thereof, a float encircling the housing and mounted on the guides for movement vertically thereon adjacent the housing, a magnet carried by the float for movement therewith between the float and the housing, a resilient stop carried by the float adjacent one end thereof for movement therewith and a stop screw carried by the housing for engaging the stop and arresting movement of the float and magnet at a selected level.

EARL H. HURLEY.

References Cited in the file of this patent

UNITED STATES PATENTS

| Number | Name | Date |
| --- | --- | --- |
| 355,815 | Ghegan | Jan. 11, 1887 |
| 2,448,251 | Campbell | Aug. 31, 1948 |